United States Patent
Kwon et al.

(10) Patent No.: US 9,757,984 B2
(45) Date of Patent: *Sep. 12, 2017

(54) FILM FOR TIRE INNER LINER, AND METHOD FOR MANUFACTURING THE SAME

(75) Inventors: So-Yeon Kwon, Busan (KR); Young-Han Jeong, Daegu (KR); Il Chung, Daegu (KR); Ok-Hwa Jeon, Gyeongsan-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 587 days.

This patent is subject to a terminal disclaimer.

(21) Appl. No.: 13/977,317

(22) PCT Filed: Dec. 30, 2011

(86) PCT No.: PCT/KR2011/100400
§ 371 (c)(1),
(2), (4) Date: Jun. 28, 2013

(87) PCT Pub. No.: WO2012/091525
PCT Pub. Date: Jul. 5, 2012

(65) Prior Publication Data
US 2013/0273358 A1    Oct. 17, 2013

(30) Foreign Application Priority Data

Dec. 30, 2010 (KR) .......... 10-2010-0139388
Dec. 29, 2011 (KR) .......... 10-2011-0146380

(51) Int. Cl.
| | | |
|---|---|---|
| *B60C 1/00* | (2006.01) |
| *B32B 27/34* | (2006.01) |
| *B32B 27/42* | (2006.01) |
| *B60C 5/14* | (2006.01) |
| *C09J 7/02* | (2006.01) |
| *C09D 171/02* | (2006.01) |
| *C08L 71/02* | (2006.01) |
| *B32B 27/28* | (2006.01) |

(52) U.S. Cl.
CPC ............. *B60C 5/14* (2013.01); *B60C 1/0008* (2013.01); *C09D 171/02* (2013.01); *C09J 7/0282* (2013.01); *B32B 27/285* (2013.01); *B32B 27/34* (2013.01); *B32B 27/42* (2013.01); *B60C 2005/145* (2013.01); *C08L 71/02* (2013.01); *C09J 2461/00* (2013.01); *C09J 2471/006* (2013.01); *C09J 2477/006* (2013.01); *Y10T 428/266* (2015.01); *Y10T 428/31761* (2015.04)

(58) Field of Classification Search
CPC ....... B32B 27/285; B32B 27/42; B32B 27/34; B60C 1/0008; B60C 2005/145; B60C 5/14; C08L 71/02; C08L 77/00; C09J 2471/006; C09J 2477/006; C09J 2461/00; C09J 7/0282; Y10T 428/31761; Y10T 428/266

See application file for complete search history.

(56) References Cited

U.S. PATENT DOCUMENTS

| | | | | |
|---|---|---|---|---|
| 5,883,195 A | * | 3/1999 | Couchoud ............... | C08L 77/00 525/167 |
| 6,079,465 A | * | 6/2000 | Takeyama ............. | B60C 1/0008 152/510 |
| 6,232,389 B1 | * | 5/2001 | Feeney et al. ................ | 524/450 |
| 9,399,374 B2 | * | 7/2016 | Jeong .................... | B60C 1/0008 |
| 9,492,981 B2 | * | 11/2016 | Song ................... | B29C 47/0021 |
| 9,527,254 B2 | * | 12/2016 | Kwon .................... | C09J 7/0264 |
| 2009/0202764 A1 | * | 8/2009 | Tonon et al. ................ | 428/36.3 |
| 2011/0152431 A1 | * | 6/2011 | Elkovitch et al. ............ | 524/430 |

FOREIGN PATENT DOCUMENTS

| | | | |
|---|---|---|---|
| EP | 1930152 | | 6/2008 |
| JP | 52-136259 | | 11/1977 |
| JP | 06-299411 | | 10/1994 |
| JP | 06-330432 | | 11/1994 |
| JP | 07-040702 | | 2/1995 |
| JP | 09165469 A | * | 6/1997 |
| JP | 10-044251 | | 2/1998 |
| JP | 2007-055227 | | 3/2007 |
| JP | 2008504173 | | 2/2008 |
| JP | 2008-049749 | | 3/2008 |
| JP | 2009107183 A | * | 5/2009 |
| JP | 2009-291962 | | 12/2009 |
| JP | 2010-013617 | | 1/2010 |
| JP | 2011-057788 | | 3/2011 |
| JP | 2013528666 | | 7/2013 |
| KR | 1020030082578 | | 10/2003 |
| KR | 10-2005-0122461 | | 12/2005 |
| WO | WO 2006001660 A1 | * | 1/2006 |

OTHER PUBLICATIONS

Machine translation of JP 2009-107183 (2009).*
Machine translation of JP 09165469 (1997).*
The Extended European Search Report (ESR), European Patent Office, dated Mar. 9, 2016, European Patent Application No. 11854317.2.

* cited by examiner

*Primary Examiner* — Callie Shosho
*Assistant Examiner* — John Freeman
(74) *Attorney, Agent, or Firm* — Lex IP Meister, PLLC

(57) ABSTRACT

The present invention relates to a film for a tire inner liner including a base film layer including a copolymer or a mixture of a polyamide-based resin and a polyether-based resin, and an adhesive layer including a resorcinol-formalin-latex (RFL)-based adhesive, and having low shrinkage rate when elongated at a high temperature and then cooled to room temperature, and a method for manufacturing the same.

17 Claims, 1 Drawing Sheet

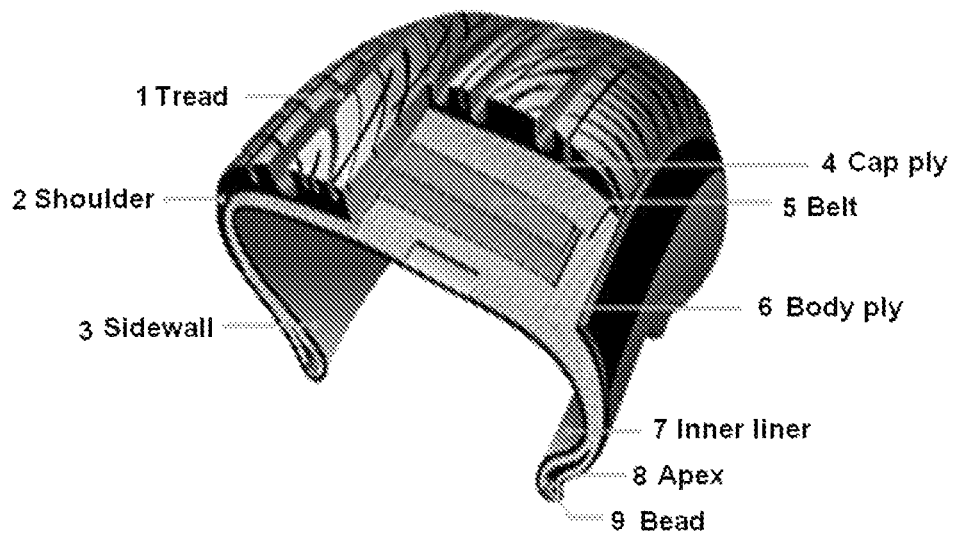

FILM FOR TIRE INNER LINER, AND METHOD FOR MANUFACTURING THE SAME

TECHNICAL FIELD

The present invention relates to a film for a tire inner liner and a method for manufacturing the same, and more particularly, to a film for a tire inner liner that may exhibit excellent an gas barrier property with a thin thickness, and thus enables light weight of a tire and improvement in automobile mileage, enables easier forming during a tire manufacturing process, and may exhibit excellent adhesion to a tire carcass layer, and a method for preparing the same.

BACKGROUND OF THE ART

A tire withstands the weight of an automobile, reduces impact from the road, and transfers driving force or braking force of an automobile to the ground. In general, a tire is a complex of fiber/steel/rubber, and has a structure as shown in FIG. 1.

Tread (1): a part contacting the road. It should afford frictional force required for driving, have good wear resistance, withstand external impact, and produce a low amount of heat.

Body ply or carcass (6): a cord layer in the tire. It should support the weight, withstand impact, and have high fatigue resistance to bending and stretching exercises during running.

Belt (5): it is located between the body plies, consists of steel wire in most cases, reduces external impact, and maintains a wide tread to afford excellent vehicle running stability.

Side wall (3): a rubber layer between a part below a shoulder (2) and bead (9). It protects the inner body ply (6).

Inner liner (7): it is located inside the tire instead of a tube, and prevents air leakage to enable a pneumatic tire.

Bead (9): a square or hexagonal wire bundle formed of rubber-coated steel wire. It positions and fixes the tire in a rim.

Cap ply (4): a special cord located on a belt of a radial tire for some cars. It minimizes movement of the belt during running.

Apex (8): triangle rubber filler used to minimize dispersion of the bead, reduce external impact to protect the bead, and prevent air inflow during forming.

Recently, a tubeless tire into which high pressure air of 30 to 40 psi is injected is commonly used without a tube, and to prevent air leakage during automobile running, an inner liner having a high gas barrier property is positioned as the inner layer of the carcass.

Previously, a tire inner liner including rubber such as butyl rubber or halobutyl rubber and the like having relatively low air permeability as a main ingredient was used, but to achieve a sufficient gas barrier property of the inner liner, rubber content or inner liner thickness should be increased. However, if rubber content and tire thickness are increased, total weight of the tire may be increased and automobile mileage may be degraded.

Further, since the rubber ingredients have relatively low heat resistance, air pockets may be generated between rubber in the inner surface of a carcass layer and the inner liner, or the shape or property of the inner liner may be changed in a vulcanization process of a tire or in an automobile running process during which repeated deformations occur at a high temperature. To bond the rubber ingredients to a carcass layer of a tire, a vulcanizer should be used or a vulcanization process should be applied, but sufficient adhesion could not be secured therewith.

Therefore, various methods have been suggested to decrease the thickness and weight of the inner liner to increase mileage and reduce changes in the shape or property of the inner liner during vulcanization of a tire or running, and the like. However, previously known methods have limitations in maintaining excellent air permeability and formability of a tire while sufficiently decreasing the thickness and weight of the inner liner. The inner liner manufactured by the previously known method exhibited property degradation or generated cracks and the like, in a tire manufacturing process during which repeated deformations occur at a high temperature, or in an automobile running process during which repeated deformations occur and a high amount of heat is generated.

Accordingly, there is a demand for development of a tire inner liner that may achieve light weight of a tire with a thinner thickness, may exhibit an excellent gas barrier property and adhesion, and enables easy forming.

DETAILED DESCRIPTION OF THE INVENTION

Technical Objectives

The present invention relates to a film for a tire inner liner that may exhibit an excellent gas barrier property with a thin thickness, and thus enables light weight of a tire and improvement in automobile mileage, and enables easier forming during a tire manufacturing process, exhibiting excellent adhesion to a tire carcass layer, and having excellent shape stability.

The present invention also provides a method for preparing the film for a tire inner liner.

Technical Solutions

The present invention provides a film for a tire inner liner, including: a base film layer including a copolymer or a mixture of 50 to 95 wt % of a polyamide-based resin and 5 to 50 wt % of a polyether-based resin; and an adhesive layer including a resorcinol-formalin-latex (RFL)-based adhesive, wherein the thickness of the base film layer is 30 to 300 µm, and the film for a tire inner liner has a shrinkage rate of 5% or less when elongated 50 to 150% at 80 to 160° C. and then cooled to room temperature.

The present invention also provides a method for manufacturing a film for a tire inner liner, including: melting and extruding a copolymer or a mixture of 50 to 95 wt % of a polyamide-based resin and 5 to 50 wt % of a polyether-based resin at 230 to 300° C. to form a base film layer having a thickness of 30 to 300 µm; and forming an adhesive layer including a resorcinol-formalin-latex (RFL)-based adhesive on at least one side of the base film layer, wherein the film for a tire inner liner has a shrinkage rate of 5% or less when elongated 50 to 150% at 80 to 160° C. and then cooled to room temperature.

Hereinafter, a film for a tire inner liner and a manufacturing method thereof according to specific embodiments of the invention will be explained in detail.

According to one embodiment of the invention, a film for a tire inner liner is provided, including: a base film layer including a copolymer or a mixture of 50 to 95 wt % of a polyamide-based resin and 5 to 50 wt % of a polyether-based resin; and an adhesive layer including a resorcinol-formalinlatex (RFL)-based adhesive, wherein the thickness of the base film layer is 30 to 300 μm, and the film for a tire inner liner has a shrinkage rate of 5% or less when elongated 50 to 150% at 80 to 160° C. and then cooled to room temperature.

The inventors confirmed through experiments that a film for a tire inner liner including a base film manufactured by copolymerizing or mixing a polyamide-based resin and a polyether-based resin in a specific content ratio, and exhibiting low shrinkage rate when elongated and cooled under specific conditions, may achieve an excellent gas barrier property and high internal pressure retention, improve formability of a green tire or a final tire, exhibit excellent adhesion to a tire carcass layer, and exhibit excellent shape stability in a tire manufacturing process or in an automobile running process, and completed the invention.

It appears that the properties of the tire inner liner film result from the application of the base film layer including a specific content of a polyether-based resin that affords elastomeric properties to a polyamide-based resin. That is, the polyamide-based resin, due to the molecular chain property, exhibits an excellent gas barrier property, for example, a 10 to 20 times higher gas barrier property compared to butyl rubber and the like commonly used in a so tire with the same thickness, and it exhibits a low modulus compared to other resins. Further, the polyether-based resin is bonded or dispersed between the polyamide-based resins, thus further lowering the modulus of the base film layer, preventing an increase in stiffness of the base film layer, and preventing crystallization at a high temperature.

Specifically, the base film layer may include a copolymer of 50 to 95 wt % of a polyamide-based resin and 5 to 50 wt % of polyether-based resin, a mixture of 50 to 95 wt % of polyamide-based resin and 5 to 50 wt % of a polyether-based resin, or both. Preferably, the base film layer may include a mixture of a copolymer of a polyamide-based resin and a polyether-based resin, and a polyamide-based resin, for example a mixture where the copolymer is mixed on the polyamide-based resin.

More preferably, the base film layer may include a polyamide-based resin, and an elastomer copolymer of polyamide-based segments and polyether-based segments, wherein the content of the polyether-based segments in the elastomer copolymer may be 15 to 50 wt % based on total weight of the base film layer.

Since the polyamide-based resin generally exhibits an excellent gas barrier property, it allows the base film layer to have low air permeability while having a thin thickness. Further, since the polyamide-based resin exhibits a relatively low modulus compared to other resins, even if applied together with a copolymer including specific contents of polyether-based segments, an inner liner film exhibiting a relatively low modulus property may be obtained, thus improving tire formability. Further, since the polyamide-based resin has sufficient heat resistance and chemical stability, it may prevent deformation or degeneration of the inner liner film when exposed to chemical substances such as additives and the like or high temperature conditions applied during a tire manufacturing process.

Furthermore, the polyamide-based resin may be used together with a copolymer including polyamide-based segments and polyether-based segments, so to exhibit relatively high reactivity to an adhesive (for example, a resorcinol-formalin-latex (RFL)-based adhesive). Thereby, the inner liner film may be easily attached to a carcass part, and interface breakage due to heat or repeated deformations during a tire manufacturing process or running and the like may be prevented to afford sufficient fatigue resistance to the inner liner film.

The polyamide-based resin that can be used in the inner liner film may include a polyamide-based resin, for example, nylon 6, nylon 66, nylon 46, nylon 11, nylon 12, nylon 610, nylon 612, a copolymer of nylon 6/66, a copolymer of nylon 6/66/610, nylon MXD6, nylon 6T, a copolymer of nylon 6/6T, a copolymer of nylon 66/PP, and a copolymer of nylon 66/PPS, or N-alkoxy alkylates thereof, for example, a methoxy methylate of 6-nylon, a methoxy methylate of 6-610-nylon, or a methoxy methylate of 612-nylon, and nylon 6, nylon 66, nylon 46, nylon 11, nylon 12, nylon 610, or nylon 612 may be preferable.

The polyamide-based resin may have relative viscosity (sulfuric acid 96% solution) of 3.0 to 3.5, preferably 3.2 to 3.4. If the viscosity of the polyamide-based resin is less than 3.0, sufficient elongation may not be secured due to a toughness decrease, and thus damage may be generated during a tire manufacturing process or automobile running, and the properties including the gas barrier property or formability and the like required for a tire inner liner film may not be secured. If the viscosity of the polyamide-based resin is greater than 3.5, the modulus or viscosity of the manufactured inner liner film layer may become unnecessarily high, and the tire inner liner may not have appropriate formability or elasticity.

Meanwhile, since the elastomer copolymer including polyamide-based segments and polyether-based segments is bonded or dispersed between the polyamide-based resins, it may further decrease the modulus of the inner liner film, prevent an increase in stiffness of the inner liner film, and prevent crystallization at a high temperature. The film for a tire inner liner including the copolymer may have high elasticity or elasticity recovery rate while securing excellent mechanical properties including durability, heat resistance, fatigue resistance, and the like. Thereby, the inner liner film may exhibit excellent formability, and a tire using the same may not be physically damaged or the properties or performance thereof may not be deteriorated during automobile running that continuously generates repeated deformations and high heat.

The content of the polyether-based segments in the elastomer copolymer may be 15 to 50 wt %, preferably 20 to 45 wt %, and more preferably 22 to 40 wt %, based on the total weight of the base film layer. If the content of the polyether-based segments of the copolymer is less than 15 wt % based on the total weight of the base film layer, the modulus of the tire inner liner film may increase to lower tire formability, or property deterioration due to repeated deformations may largely occur. If the content of the polyether-based segments of the copolymer is greater than 50 wt % based on the total weight of the base film layer, the gas barrier property of the inner liner film may be lowered, the inner liner may not easily adhere to a carcass layer due to lowered reactivity to the adhesive, and a uniform film may not be easily manufactured due to increased elasticity of the inner liner film.

The polyamide-based segment refers to a repeat unit including an amide group (—CONH—), and it may be formed from polyamide-based resin or a precursor thereof participating in a polymerization reaction. The polyamide-based segments of the elastomer copolymer may include a repeat unit of the following Chemical Formula 1 or Chemical Formula 2.

[Chemical Formula 1]

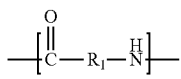

In Chemical Formula 1, $R_1$ is a C1-20 linear or branched alkylene group or a C7-20 linear or branched arylalkylene group.

[Chemical Formula 2]

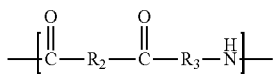

In Chemical Formula 2, $R_2$ is a C1-20 linear or branched alkylene group, and $R_3$ is a C1-20 linear or branched alkylene group or a C7-20 linear or branched arylalkylene group.

The polyether-based segment refers to a repeat unit including an alkylene oxide ("-alkyl-O—") group, and it may be formed from a polyether-based resin or a precursor thereof participating in a polymerization reaction. The polyether-based segments of the elastomer copolymer may include a repeat unit of the following Chemical Formula 3.

[Chemical Formula 3]

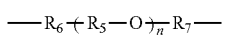

In Chemical Formula 3, $R_5$ is a C1-10 linear or branched alkylene group, n is an integer of from 1 to 100, and $R_6$ and $R_7$ may be identical or different, and are independently a direct bond, —O—, —NH—, —COO—, or —CONH—.

The copolymer including polyamide-based segments and polyether-based segments may be a random copolymer or a block copolymer, and preferably a block copolymer for achieving more uniform properties of the inner liner film.

The elastomer copolymer including polyamide-based segments and polyether-based segments may have a weight average molecular weight of 50,000 to 300,000, preferably 70,000 to 150,000. If the weight average molecular weight of the copolymer is less than 50,000, sufficient mechanical properties required for use in an inner liner film may not be secured, and a sufficient gas barrier property may not be achieved due to low air permeability. Further, if the weight average molecular weight of the copolymer is greater than 300,000, the modulus or crystallinity of the inner liner film may excessively increase during high temperature heating, and elasticity or elasticity recovery rate required for an inner liner film may not be secured.

Meanwhile, the elastomer copolymer may include the polyamide-based segments and the polyether-based segments in a weight ratio of 6:4 to 3:7, preferably 5:5 to 4:6, while the content of the polyether-based segments is 15 to 50 wt % based on total weight of the film.

As explained, if the content of the polyether-based segments is too low, the modulus of the inner liner film may increase to lower formability of a tire, or properties may be largely deteriorated due to repeated deformations. If the content of the polyether-based segments is too high, the gas barrier property of the inner liner film may be lowered, the inner liner film may not easily adhere to a carcass layer due to lowered reactivity to the adhesive, and a uniform film may not be easily manufactured due to increased elasticity of the inner liner film.

In the base film layer, the polyamide-based resin and the copolymer may be included in a weight ratio of 6:4 to 3:7, preferably 5:5 to 4:6. If the content of the polyamide-based resin is too low, the density or gas barrier property of the inner liner film may be lowered. If the content of the polyamide-based resin is too high, the modulus of the inner liner film may become excessively high or formability of a tire may be lowered, the polyamide-based resin may be crystallized under a high temperature environment during a tire manufacturing process or automobile running, and cracks may be generated due to repeated deformations.

Meanwhile, the film for a tire inner liner may have a shrinkage rate of 5% or less, more preferably 3% or less, when elongated 50 to 150% at 80 to 160° C. and then cooled to room temperature. When elongated 150% at 160° C. and then cooled to room temperature, the film for a tire inner liner may have a shrinkage rate of 3% or less.

Since the film for a tire inner liner has a low shrinkage rate even if elongated or deformed under a high temperature condition and then cooled, it may achieve excellent formability and high shape stability even in a tire manufacturing process during which elongation and deformation occur at a high temperature.

Particularly, even if the above tire inner liner film and tire constituting parts such as a body ply and the like are sequentially deposited on a tire forming drum, elongated and deformed at a high temperature, and then cooled to room temperature in a commonly known pneumatic tire manufacturing process, the tire inner liner film may maintain a constant shape without significant shrinkage or deformation. Thus, partial or whole peel-off of the tire inner liner film from a body ply layer in a tire, wrinkle formation on the tire inner liner film, or air pocket generation between the tire inner liner film and a body ply layer and the like may be prevented.

In the process of cooling to room temperature, cooling speed may be variously applied, and for example, a film for a tire inner liner elongated 50 to 150% at 80 to 160° C. may be allowed to stand at room temperature or at 10 to 40° C. to cool.

The shrinkage rate may be calculated by the following Equation 1. The initial length of a tire inner liner film at the following measurement temperature, and the length of a tire inner liner film measured when cooled to room temperature after applying measurement elongation conditions, may be measured using equipment such as thermal shrinkage stressor and the like. The measurement temperature and the measurement elongation conditions are conditions that can be applied in a tire manufacturing process, and mean the temperature and elongation conditions applied when calculating the shrinkage rate.

Shrinkage rate of inner liner film(%)=(the initial length of inner liner film at measurement temperature−the length of inner liner film when cooled to room temperature after applying elongation conditions)×100/(the initial length of inner liner film at measurement temperature) [Equation 1]

Meanwhile, if the film for a tire inner liner is used, a small load may be generated even if elongated under specific conditions in the curing step of a tire so manufacturing process, thus improving formability of a green tire or a final tire. Since the inner liner film has a low modulus property due to a specific film layer and adhesive layer, it may be elongated or deformed according to the shape of a tire even if a small force is applied when forming a tire, thus enabling excellent formability of a tire. Particularly, the film for a tire inner liner may be easily elongated or stretched and uniformly adhere inside of a tire without degradation of properties during a high temperature tire manufacturing process. Specifically, the inner liner film may have tensile stress of 310 kg/cm$^2$ or less, and preferably 230 kg/cm$^2$ or less, when elongated 150% at 160° C.

The film for a tire inner liner may be partially elongated or shrunken when heated to 80 to 160° C., however the degree of elongation or shrinkage of the inner liner film may be relatively insignificant due to the chemical composition. As explained above, the film for a tire inner liner may exhibit a low modulus property when high temperature conditions are applied, and generate low tensile stress when elongated, thus exhibiting excellent formability, while the length or shape may not be significantly deformed even under high temperature conditions.

Thereby, even if heating is conducted after sequentially depositing the tire inner liner film and other tire constituting parts such as a body ply and the like in a tire manufacturing process, the shape or length may not be significantly changed, thus enabling easy tire forming, securing high shape stability, and preventing separation, peel-off, or warping of each constituting part of a green tire.

Particularly, the film for a tire inner liner may not be significantly elongated and have low coefficient of thermal expansion at high temperature, for example at 80° C. to 160° C. Specifically, the film for a tire inner liner may have coefficient of thermal expansion (CTE) of $100 \times 10^{-6}$/° C. to $500 \times 10^{-6}$/° C., preferably $140 \times 10^{-6}$/° C. to $400 \times 10^{-6}$/° C., at 80° C. to 160° C.

Since the film for a tire inner liner may exhibit a low coefficient of thermal expansion under high temperature conditions in a tire manufacturing process or in an automobile running process, for example, a coefficient of thermal expansion of $100 \times 10^{-6}$/° C. to $500 \times 10^{-6}$/° C. at 80 to 160° C., a change in the size or length of the film according to temperature change may be insignificant, and excellent shape stability may be achieved. Particularly, since the film for a tire inner liner has a specific coefficient of thermal expansion, deformation or elongation-shrinkage due to heat may be minimized, and crack or peel-off from a carcass layer due to repeated deformation or elongation-shrinkage in a high temperature tire manufacturing process or in an automobile running process may be prevented. Thus, if the film for a tire inner liner is used, excellent shape stability and fatigue resistance, and improved adhesion maintenance, may be achieved.

If the film for a tire inner liner exhibits a coefficient of thermal expansion greater than $500 \times 10^{-6}$/° C. at 80 to 160° C., the shape of the film may be significantly deformed when the film is elongated according to temperature change, and durability of the final product may be lowered. Also, if the film for a tire inner liner exhibits a coefficient of thermal expansion of less than $100 \times 10^{-6}$/° C. at 80 to 160° C., a large difference from the coefficient of thermal expansion of tire rubber may be generated to significantly lower formability of a tire, and crack or peel-off from a carcass layer may be easily generated.

The base film layer may have a thickness of 30 to 300 µm, preferably 40 to 250 µm, and more preferably 40 to 200 µm. Thus, the film for a tire inner liner according to one embodiment of the invention may have low air permeability, for example oxygen permeability of 200 cc/(m$^2$·24 hr·atm) or less, while having a thin thickness, compared to those previously known.

Meanwhile, as described below, if the base film layer is aged under constant temperature and humidity conditions, the base film layer may have an equilibrium moisture content of 5 to 9% under a temperature of 25° C. and relative humidity of 65%.

The equilibrium moisture content refers to a percent value of the amount of moisture in resin or fiber when the resin or fiber reaches water balance under constant ambient conditions. The same resin or fiber has a constant equilibrium moisture content under the same ambient conditions. In general, nylon resin has an equilibrium moisture content of 3 to 4.5% under a temperature of 25° C. and relative humidity of 65%, and if nylon is immersed in water, it is known to have an equilibrium moisture content of about 10%.

That is, if the base film layer is aged under constant temperature and humidity conditions, it appears that changes occur in the physical/chemical structure in the film, and thus the base film may have an equilibrium moisture content of 5 to 9%, preferably 6 to 8%, under a temperature of 25° C. and relative humidity of 65%.

Specifically, after aging under constant temperature and humidity conditions, moisture is adsorbed into the polyamide-based resin or polyamide-based segments, and thereby crystallinity of a tightly arranged molecular chain becomes low, and the initial modulus of the base film layer becomes low. Thereby, the base film layer has a low modulus property and high elasticity or elasticity recovery rate, and the like, thus exhibiting excellent formability in a tire manufacturing process. In addition, if the base film layer is used, crystallization of the film itself or damage such as cracks in the film may be prevented in a tire manufacturing process during which significant deformations occur under high temperature conditions, or in an automobile running process during which repeated deformations are continuously applied.

The base film may layer further include additives such as a heat resistant oxidant, a heat stabilizer, an adhesion improving agent, or a mixture thereof. Specific examples of the heat resistant oxidant may include N,N'-hexamethylene-bis-(3,5-di-tert-butyl-4-hydroxy-hydrocinnamamide), for example, a commercialized product such as Irganox 1098, tetrakis[methylene(3,5-di-t-butyl-4-hydroxyhydrocinnamate)]methane, for example, a commercialized product such as Irganox 1010, or 4,4'-di-cumyl-di-phenyl-amine, for example, Naugard 445, and the like. Specific examples of the heat stabilizer may include benzoic acid, triacetonediamine, or N,N'-bis-(2,2,6,6-tetramethyl-4-piperidyl)-1,3-benzenedicarboxamide, and the like. However, the additives are not limited thereto, and those known to be usable for a tire inner liner film may be used without specific limitations.

Meanwhile, the base film layer may be an unstretched film. If the base film layer is an unstretched film, it may have a low modulus and high strain, and thus it may be appropriately applied in a tire forming process during which high expansion is generated. Further, since crystallization hardly occurs in the unstretched film, damage such as cracks and the like may be prevented even if deformations repeatedly occur. Further, since the unstretched film does not have a large property difference and orientation in a specific direction, an inner liner having uniform properties may be obtained.

As described in the following manufacturing method of a film for a tire inner liner, the base film may be manufactured in the form of an unstretched or non-oriented film by maximally preventing the orientation of the base film layer, for example, by viscosity control through optimization of the melt-extrusion temperature, modification of a die standard, control of winding speed, and the like.

If an unstretched film is applied for the base film layer, a film for an inner liner may be easily manufactured as a cylindrical or sheet type in a tire manufacturing process. Particularly, in case an unstretched sheet-type film is applied for the base film layer, film manufacturing facilities need not be separately constructed according to tire size, and impact and wrinkles may be minimized during transfer and storage. In case the base film is manufactured as a sheet type, a process of adding an adhesive layer may be more easily conducted, and damage or deformation and the like generated during a manufacturing process due to a standard difference from a forming drum may be prevented.

Meanwhile, the adhesive layer may include a specific resorcinol-formalin-latex (RFL)-based adhesive. The specific resorcinol-formalin-latex (RFL)-based adhesive has high reactivity and adhesion to the base film layer, and may achieve excellent bonding to a tire carcass layer. Thus, in the film for a tire inner liner, the base film may be strongly bonded to a tire carcass layer without significantly increasing the thickness of the adhesive layer.

The adhesive layer may be formed on one side or both sides of the base film layer to a thickness of 0.1 to 20 μm, preferably 0.5 to 10 μm. If the thickness of the adhesive layer is too thin, sufficient adhesion may not be achieved, the adhesive layer may be torn or broken during stretching or expansion during a tire manufacturing process, and stress may be concentrated on a part of the adhesive layer to lower properties of the adhesive layer. If the thickness of the adhesive layer is too thick, the weight of a tire may be increased or formability may be lowered, and the interface of the base film layer and a carcass layer may be separated in a tire manufacturing process or in an automobile running process.

The adhesive layer may be formed on one side or both sides of the base film layer. To adhere the inner liner film to a carcass layer of a tire, an adhesive layer is generally formed on one side of the base film, but in case a multi-layered inner liner film is applied, or adhesion to rubber on both sides is required according to a tire forming method and construction design, for example when an inner liner film covers a bead part, the adhesive layer may be preferably formed on both sides of the base film.

The resorcinol-formalin-latex (RFL)-based adhesive may include 2 to 35 wt % of a condensate of resorcinol and formaldehyde, and 65 to 98 wt % of latex.

The condensate of resorcinol and formaldehyde may be included in a content of 2 wt % or more based on total weight of the adhesive layer, in terms of a chemical reaction for excellent adhesion, and it may be included in a content of 35 wt % or less to maintain fatigue resistance while maintaining excellent adhesion.

The condensate of resorcinol and formaldehyde may be obtained by mixing resorcinol and formaldehyde in a mole ratio of 1:0.3 to 1:3.0, preferably 1:0.5 to 1:2.5, and conducting condensation.

The latex may be included in a content of 68 wt % or more based on total weight of the adhesive layer for flexibility and effective cross-linking reaction with rubber, and it may be included in a content of 98 wt % or less for increasing a chemical reaction with the base film and maintaining properties of the adhesive layer.

The latex may be selected from the group consisting of natural rubber latex, styrene/butadiene rubber latex, acrylonitrile/butadiene rubber latex, chloroprene rubber latex, styrene/butadiene/vinylpyridine rubber latex, and a mixture thereof.

Meanwhile, the resorcinol-formalin-latex (RFL)-based adhesive may further include additives such as a surface tension control agent, a heat resistant agent, an antifoaming agent, a filler, and the like. Although the surface tension control agent is applied for uniform coating of the adhesive layer, it may cause a decrease in adhesion when introduced in an excessive amount, and thus, it may be included in the content of 2 wt % or less, or 0.0001 to 2 wt %, preferably 1.0 wt % or less, or 0.0001 to 0.5 wt %, based on total weight of the adhesive. The surface tension control agent may be selected from the group consisting of a sulfonic acid salt anionic surfactant, a sulfate ester surfactant, a carboxylic acid salt anionic surfactant, a phosphate ester anionic surfactant, a fluorine-containing surfactant, a silicone-based surfactant, a polysiloxane-based surfactant, and a combination thereof.

The film for a tire inner liner may maintain optimum internal pressure even after use for a long period. For example, when 90 days-IPR (internal pressure retention) of a tire using the tire inner liner film is measured under a 21° C. and 101.3 kPa condition according to ASTM F1112-06, internal pressure retention as shown in the following Equation 2 may become 95% or more, that is, an internal pressure decrease may be 5% or less. Thus, if the film for a tire inner liner is used, degradation of mileage and overturning accidents caused by low internal pressure may be prevented.

[Equation 2]

$$\text{Internal pressure retention (\%)} = \left\{ 1 - \frac{\begin{array}{c}\text{Internal pressure of the tire at first evaluation} - \\ \text{Internal pressure of the tire after standing for 90 days}\end{array}}{\text{Internal pressure of the tire at first evalution}} \right\} * 100$$

According to another embodiment of the invention, a method for manufacturing a film for a tire inner liner is provided, including: melting and extruding a copolymer or a mixture of 50 to 95 wt % of a polyamide-based resin and 5 to 50 wt % of a polyether-based resin at 230 to 300° C. to form a base film layer having a thickness of 30 to 300 μm; and forming an adhesive layer including a resorcinol-formalin-latex (RFL)-based adhesive on at least one side of the base film layer, wherein the film for a tire inner liner has a shrinkage rate of 5% or less when elongated 50 to 150% at 80 to 160° C. and then cooled to room temperature.

As explained above, a film for a tire inner liner including a base film manufactured by copolymerizing or mixing a polyamide-based resin and a polyether-based resin in a specific content ratio, and exhibiting low shrinkage rate when elongated and cooled under specific conditions, may achieve an excellent gas barrier property and high internal pressure retention with a thin thickness, improve formability of a green tire or a final tire, exhibit excellent adhesion to a tire carcass layer, and exhibit excellent shape stability in a tire manufacturing process or in an automobile running process. Since the base film layer exhibits high reactivity to a specific adhesive layer, for example, an adhesive layer including a resorcinol-formalin-latex (RFL)-based adhesive, the film for a tire inner liner may exhibit high adhesion to a carcass layer.

Specifically, when the film for a tire inner liner manufactured according to the above method is elongated 50 to 150% at 80 to 160° C. and then cooled to room temperature, the shrinkage rate may be 5% or less, and more preferably 3% or less. When the film for a tire inner liner is elongated 150% at 160° C. and then cooled to room temperature, the shrinkage rate may be 3% or less. The details of the shrinkage rate are as explained above.

The film for a tire inner liner manufactured by the above method may have a low coefficient of thermal expansion without being significantly elongated under a high temperature condition, for example at 80° C. to 160° C. Specifically, the film for a tire inner liner may have a coefficient of thermal expansion (CTE) of $100 \times 10^{-6}/°$ C. to $500 \times 10^{-6}/°$ C., and preferably $140 \times 10^{-6}/°$ C. to $400 \times 10^{-6}/°$ C. at 80° C. to 160° C. The film for a tire inner liner may exhibit a low coefficient of thermal expansion thus exhibiting excellent shape stability, and minimize deformation or elongation-shrinkage due to heat thus preventing cracks or peel-off from a carcass layer and the like, generated due to repeated deformations or elongation-shrinkage in a high temperature tire manufacturing process or in an automobile running process.

The formed base film layer may include a copolymer of 50 to 95 wt % of a polyamide-based resin and 5 to 50 wt % of a polyether-based resin, a mixture of 50 to 95 wt % of a polyamide-based resin and 5 to 50 wt % of a polyether-based resin, or both. The details of the polyamide-based resin and the polyether-based resin are as explained above.

Meanwhile, the step of forming a base film layer may further include melting and extruding an elastomer copolymer including polyamide-based segments and polyether-based segments, and a polyamide-based resin at 230 to 300° C., and the content of the polyether-based segments in the elastomer copolymer may be 15 to 50 wt % based on total weight of the base film layer.

The elastomer copolymer may include polyamide-based segments and polyether-based segments in the weight ratio of 6:4 to 3:7, preferably 5:5 to 4:6, while the content of the polyether-based segments is 15 to 50 wt % based on total weight of the base film layer.

The details of the polyamide-based resin, and the elastomer copolymer including polyamide-based segments and polyether-based segments, are as so explained above.

Meanwhile, the method for manufacturing the film for a tire inner liner may further include mixing the polyamide-based resin and the elastomer copolymer in a weight ratio of 6:4 to 3:7. If the content of the polyamide-based resin is too low, the density or gas barrier property of the base film layer may be lowered. If the content of the polyamide-based resin is too high, the modulus of the base film layer may become too high or formability of a tire may be lowered, the polyamide-based resin may be crystallized under a high temperature environment during a tire manufacturing process or automobile running, and cracks may be generated due to repeated deformations. In the mixing step, any equipment or method known to be usable for mixing a polymer resin may be used without specific limitations.

The polyamide-based resin and the copolymer may be introduced into a feeder after they are mixed, or sequentially or simultaneously introduced into a feeder and mixed.

Meanwhile, the base film layer may be formed by melting and extruding raw materials introduced in an extruder, for example the copolymer or mixture of the polyamide-based resin and the polyether-based resin, preferably the mixture of the polyamide-based resin and the elastomer copolymer, at 230 to 300° C.

The melting temperature of the introduced raw materials may be 230 to 300° C., preferably 240 to 280° C. The melting temperature should be higher than the melting point of a polyamide-based compound, but if it is too high, carbonization or decomposition may occur to damage the properties of a film, and bonding between polyether-based resins may occur or orientation may be generated in a fiber arrangement direction, and thus it may be unfavorable for manufacturing an unstretched film.

The molten substance may be extruded and provided as a base film with a thickness of 30 to 300 μm. The thickness of the manufactured film may be controlled by controlling extrusion conditions, for example, by controlling a discharge amount of the extruder or a die gap of the extruder, or by changing the winding speed in a cooling process or recovery process of the extruded substance. In the extrusion process, any extrusion dies known to be usable for extrusion of a polymer resin may be used without specific limitations, but a T-type die may be preferably used so that the thickness of the base film may be made more uniform or orientation may not be generated in the base film.

To uniformly control the thickness of the base film layer in the range of 30 to 300 μm, the die gap of the extrusion die may be controlled to 0.3 to 1.5 mm. In the step of forming the base film, if the die gap is too small, shear pressure and shear stress in the melt-extrusion process may become too high, and thus, uniform shape of the extruded film may not be formed and productivity may be lowered. Further, if the die gap is too large, stretching of the melt extruded film may largely occur to generate orientation, and a property difference between a machine direction and a transverse direction of the manufactured based film may become large.

Furthermore, in the manufacturing method of the film for a tire inner liner, the thickness of the manufactured base film may be continuously measured, and the measurement result is fed back to control the part of the extrusion die where non-uniform thickness appears, for example, a lip gap adjustment bolt of a T-die, thus reducing deviation of the manufactured base film, thereby obtaining a film having a uniform thickness. The measurement of the film thickness feed-back control of the extrusion die may constitute an automated process step using an automated system, for example an Auto Die system and the like.

The raw materials supplied in the melting and extrusion step may be supplied to an extrusion die through a feeder maintained at 50 to 100° C. Since the feeder is maintained at 50 to 100° C., the raw materials may have optimum properties such as viscosity and the like, and thus may be easily transferred to the extrusion die or other parts of the extruder, faulty feeding due to agglomeration of the raw materials and the like may be prevented, and a so more uniform base film may be formed in the subsequent melting and extrusion process. The construction of the feeder is not specifically limited, and it may be a common feeder included in an extruder and the like for preparing a polymer resin.

Meanwhile, the manufacturing method of the film for a tire inner liner may further include a step of solidifying the base film layer formed through melting and extrusion in a cooling part maintained at a temperature of 5 to 40° C., preferably 10 to 30° C.

By solidifying the base film layer formed through melting and extrusion in a cooling part maintaining a temperature of 5 to 40° C., a film with a more uniform thickness may be provided. If the base film layer formed through melting and extrusion is folded or attached to a cooling part maintained at an appropriate temperature, orientation may not substantially occur, and the base film layer may be provided as an unstretched film. Specifically, the solidifying step may include uniformly attaching the base film formed through melting and extrusion to a cooling roll maintained at a temperature of 5 to 40° C., using an air knife, an air nozzle, an electrostatic charging device (pinning device), or a combination thereof.

In the solidifying step, by attaching the base film formed through melting and extrusion to a cooling roll using an air knife, an air nozzle, an electrostatic charging device (pinning device), or a combination thereof, blowing of the base film layer after extrusion or partially non-uniform cooling and the like may be prevented, and thus a film having a more uniform thickness may be formed, and areas having a relatively thick or thin thickness compared to the surrounding parts in the film may not be substantially formed.

The molten material extruded under specific die gap conditions may be attached or folded to a cooling roll installed at a horizontal distance of 10 to 150 mm, preferably 20 to 120 mm, from the die outlet, to eliminate stretching and orientation. The horizontal distance from the die outlet to the cooling roll may be a distance between the die outlet and a point where discharged molten so material is folded to the cooling roll. If the linear distance between the die outlet and the cooling roll attaching point of the molten film is too small, uniform flow of melted extruded resin may be disturbed and the film may be non-uniformly cooled, and if the distance is too large, the effect for inhibiting film stretching may not be achieved.

In the step of forming the base film, except the above-explained steps and conditions, film extrusion conditions commonly used for manufacturing of a polymer film, for example, screw diameter, screw rotation speed, line speed, and the like may be appropriately selected.

Meanwhile, the manufacturing method of the film for a tire inner liner may include a step of forming an adhesive layer including a resorcinol-formalin-latex (RFL)-based adhesive on at least one side of the base film layer.

The step of forming the adhesive layer may be progressed by coating the resorcinol-formalin-latex (RFL)-based adhesive on one side or both sides of the base film, and then drying. The formed adhesive layer may have a thickness of 0.1 to 20 μm, and preferably 0.1 to 10 μm. The resorcinol-formalin-latex (RFL)-based adhesive may include 2 to 32 wt % of a condensate of resorcinol and formaldehyde, and 68 to 98 wt %, and preferably 80 to 90 wt %, of latex. That is, the step of forming an adhesive layer may include coating an adhesive including 2 to 30 wt % of a condensate of resorcinol and formaldehyde, and 68 to 98 wt % of latex, on at least one side of the base film layer to a thickness of 0.1 to 20 μm.

The details of the resorcinol-formalin-latex (RFL)-based adhesive with the above specific composition are as explained above.

A commonly used coating method or apparatus may be used to coat the adhesive without specific limitations, but knife coating, bar coating, gravure coating or spraying, or immersion may be used. However, knife coating, gravure coating, or bar coating may be preferable for uniform coating of the adhesive.

After forming the adhesive layer on one side or both sides of the base film, drying and adhesive reaction may be simultaneously progressed, but heat treatment may be progressed after drying considering reactivity of the adhesive, and the formation of the adhesive layer and drying and heat treatment may be applied several times for thickness of the adhesive layer or application of a multi-layered adhesive. After coating the adhesive on the base film, heat treatment may be conducted by solidifying and reacting at 100~150° C. for approximately 30 seconds to 3 minutes.

Meanwhile, the method for manufacturing a film for a tire inner liner may further include a step of aging the base film layer under constant temperature and humidity conditions. If the base film layer is aged under constant temperature and humidity conditions, the modulus property may be lowered, elasticity or elasticity recovery rate and the like may be increased, and properties such as the gas barrier property, durability, fatigue resistance, and the like may be largely improved. Thus, if the step of aging under constant temperature and humidity conditions is conducted, the base film layer may have distinguishable properties from the previously known films, and may have distinct properties from a common nylon resin and the like.

Specifically, after aging under constant temperature and humidity conditions, moisture is adsorbed into the polyamide-based resin or the polyamide-based segments of the elastomer copolymer, and thus crystallinity of the tightly arranged molecular chain may become lower, and the initial modulus of the base film layer may become lower.

Meanwhile, in the step of aging the base film layer under constant temperature and humidity conditions, the constant temperature condition may be selected from a temperature range of 20° C. to 30° C., and the constant humidity condition may be selected from a relative humidity range of 60% to 70%.

The step of aging the base film layer under constant temperature and humidity conditions may be conducted for 12 hours to 48 hours. If the time is too short, effects of aging under constant temperature and humidity conditions may not be achieved, and if the time is too long, unnecessary time is wasted after completing the aging, and thus process time or cost may be unnecessarily increased.

Advantageous Effect of the Invention

According to the present invention, a film for a tire inner liner that may exhibit an excellent gas barrier property with a thin thickness, and thus enables light weight of a tire and improvement in automobile mileage, enables easier forming during a tire manufacturing process, may exhibit excellent adhesion to a tire carcass layer, and has excellent shape stability, and a method for manufacturing the same is provided.

BRIEF DESCRIPTION OF THE DRAWINGS

FIG. 1 schematically shows the structure of a tire.

DETAILS FOR PRACTICING THE INVENTION

Hereinafter, preferable examples are presented, but these examples are only to illustrate the invention and the scope of the invention is not limited thereto.

Examples and Comparative Examples: Manufacture of a Film for a Tire Inner Liner

Example 1

(1) Manufacture of a Base Film 35 wt % of nylon 6 resin [relative viscosity (sulfuric acid 96% solution) 3.3], and 65 wt % of an elastomer copolymer resin (including 50 wt % of polyamide-based segments and 50 wt % of polyether-based segments, having an absolute weight average molecular weight 150,000) were mixed. The temperature of the mixture was controlled and it was dried so that coagulation may not occur between chips, and then the temperature of the feeder was controlled to 50 to 100° C. and the mixture was supplied to an extrusion die while preventing welding of the mixture in an extrusion screw and resulting faulty feeding.

Further, the mixture was extruded at 260° C. through a T-type die (die gap: 1.0 mm) while maintaining a uniform flow of the molten resin, and the molten resin was cooled and solidified in a film shape with a uniform thickness on the surface of a cooling roll maintained at 25° C. using an air knife, to obtain an unstretched base film having a thickness of 100 μm at a speed of 15 m/min without passing stretching and heat treatment sections.

(2) Coating of Adhesive

Resorcinol and formaldehyde were mixed at a mole ratio of 1:2, and then condensation was conducted to obtain a condensate of resorcinol and formaldehyde. 12 wt % of the condensate of resorcinol and formaldehyde and 88 wt % of styrene/butadiene-1,3/vinylpyridine latex were mixed to obtain a resorcinol/formaldehyde-latex (RFL)-based adhesive at a concentration of 20%.

The resorcinol/formaldehyde-latex (RFL)-based adhesive was coated on the base film to a thickness of 1 um using a gravure coater, and dried and reacted at 150° C. for 1 minute to form an adhesive layer.

Example 2

(1) Manufacture of a Base Film

A base film was manufactured by the same method as Example 1, except that 40 wt % of nylon 6 resin [relative viscosity (sulfuric acid 96% solution) 3.3] and 60 wt % of an elastomer copolymer resin (including 60 wt % of polyamide-based segments and 40 wt % of polyether-based segments, having an absolute weight average molecular weight of 150,000) were mixed.

(2) Coating of Adhesive

An adhesive layer was formed on the above manufactured base film by the same method as Example 1.

Example 3

(1) Manufacture of a Base Film

A base film was manufactured by the same method as Example 1, so except that 50 wt % of nylon 6 resin [relative viscosity (sulfuric acid 96% solution) 3.3] and 50 wt % of an elastomer copolymer resin (including 60 wt % of polyamide-based segments and 40 wt % of polyether-based segments, having an absolute weight average molecular weight of 150,000) were mixed.

(2) Coating of Adhesive

An adhesive layer was formed on the above manufactured base film by the same method as Example 1.

Example 4

(1) Manufacture of a Base Film

The unstretched base film manufactured in Example 1 was aged under a temperature of 25° C. and relative humidity of 65% for 24 hours, to obtain a base film.

(2) Coating of Adhesive

An adhesive layer was formed on the above manufactured base film by the same method as Example 1.

Example 5

(1) Manufacture of a Base Film

The unstretched base film manufactured in Example 2 was aged under a temperature of 25° C. and relative humidity of 65% for 24 hours, to obtain a base film.

(2) Coating of Adhesive

An adhesive layer was formed on the above manufactured base film by the same method as Example 1.

Example 6

(1) Manufacture of a Base Film

The unstretched base film manufactured in Example 3 was aged under a temperature of 25° C. and relative humidity of 65% for 24 hours, to obtain a so base film.

(2) Coating of Adhesive

An adhesive layer was formed on the above manufactured base film by the same method as Example 1.

Comparative Example 1

A mold releasing agent and a finishing agent were introduced into butyl rubber and mixed, then refined to obtain a film for a tire inner liner with a thickness of 70 μm, and an adhesion rubber (tie gum) was formed on the inner liner film to a thickness of 1 μm.

Comparative Example 2

(1) Manufacture of a Base Film

A base film was manufactured by the same method as Example 1, except that 80 wt % of nylon 6 resin [relative viscosity (sulfuric acid 96% solution) 3.3] and 20 wt % of an elastomer copolymer resin (including 80 wt % of polyamide-based segments and 20 wt % of polyether-based segments having an absolute weight average molecular weight of 150,000) were mixed.

(2) Coating of Adhesive

A resorcinol-formalin-latex (RFL)-based adhesive was prepared by the same method as Example 1, and it was coated on the base film and dried to form an adhesive layer with a thickness of 1 μm.

Comparative Example 3

(1) Manufacture of a Base Film

A base film was manufactured by the same method as Example 1, except that 20 wt % of nylon 6 resin [relative viscosity (sulfuric acid 96% solution) 3.3], and 80 wt % of elastomer copolymer resin (including 20 wt % of polyamide-based segments and 80 wt % of polyether-based segments, having absolute weight average molecular weight of 150,000) were mixed.

(2) Coating of Adhesive

Resorcinol-formalin-latex (RFL)-based adhesive was prepared by the same method as Example 1, and it was coated on the base film and dried to form an adhesive layer with a thickness of 1 μm.

Comparative Example 4

(1) Manufacture of a Base Film

A chip was manufactured using only nylon 6 resin with relative viscosity of 3.4, and the manufactured chip was extruded with a circular die at 260° C. to obtain an unstretched base film having a thickness of 70 μm at a speed of 30 m/min without passing stretching and heat treatment sections.

(2) Coating of Adhesive

A resorcinol-formalin-latex (RFL)-based adhesive was prepared by the same method as Example 1, and it was coated on the base film and dried to form an adhesive layer with a thickness of 1 μm.

Comparative Example 5

The chip manufactured in Example 1 was extruded with a circular die at 320° C. to attempt to manufacture a film for a tire inner liner. However, melt viscosity of the film became too low due to a high temperature, and thus a film shape could not be formed, and manufacture of a product failed due to generation of a carbide of the soft segment ingredients having a low melt viscosity.

Experimental Example

Experimental Example 1: Measurement of Coefficient of Thermal Expansion of Inner Liner Film The inner liner films obtained in the examples and comparative examples were cut to a size of 20*4*0.07 mm (length*width*thickness) and mounted on a sample holder. The sample holder was mounted on a TMA so chamber (Diamond TMA, PerkinElmer) and a primary load of 80 Mn was applied to the film. The length of the sample was then measured according to temperature while elevating the temperature in the range of −60 to 220° C. at a speed of 10° C. per minute, and the CTE (coefficient of thermal expansion) was calculated.

※ $CTE = \Delta L/L_o * \Delta T$

[ΔL: the amount of change in sample length (μm), $L_o$: the length of sample (m), ΔT: the amount of change in temperature (° C.)]

Experimental Example 2: Measurement of Shrinkage Rate of Inner Liner Film

When the tire inner liner films obtained in the examples and comparative examples were elongated 150% at 80° C., 100° C., 120° C., and 160° C., and then cooled to room temperature, the shrinkage rate was measured using a thermal shrinkage stressor (KANEBO Company).

Experimental Example 3: Measurement of Tensile Stress According to Elongation of Inner Liner Film Tensile stress of the inner liner film according to elongation was measured using a universal testing machine of Instron Corporation (Model 5566). Specifically, the tire inner liner films obtained in the examples and comparative examples were cut to a certain size of 10*100*0.07 mm (length*width*thickness) and mounted on a gripper, and then load per unit area of a load cell was measured when the film was elongated 150% in a longitudinal direction in a chamber at 160° C.

Experimental Example 4: Oxygen Permeability Test

Oxygen permeability of the tire inner liner films obtained in the examples and comparative examples was measured. The specific measurement method is as follows.

(1) Oxygen permeability: measured according to ASTM D 3895, using an oxygen permeation analyzer (Model 8000, Illinois Instruments Company) under a 25° C. and 60% RH atmosphere.

Experimental Example 5: Measurement of Equilibrium Moisture Content

Equilibrium moisture content of each base film layer obtained in the examples and comparative examples was measured by evaluating a weight reduction rate after aging at 150° C. for 3 minutes using PRECISA XM60 equipment at 25° C. and 65% RH.

The results of Experimental Examples 1 to 4 are summarized in the following Table 1.

TABLE 1

Results of Experimental Examples 1 to 4 for Examples 1 to 4

| | | Example 1 | Example 2 | Example 3 | Example 4 | Example 5 | Example 6 |
|---|---|---|---|---|---|---|---|
| Shrinkage rate (%) | 80° C./150% elongation | 3.3 | 3.6 | 3.6 | 2.0 | 2.1 | 2.1 |
| | 100° C./150% elongation | 3.5 | 3.7 | 3.7 | 2.3 | 2.1 | 2.1 |
| | 120° C./150% elongation | 3.6 | 3.8 | 3.9 | 2.4 | 2.2 | 2.2 |
| | 160° C./150% elongation | 3.7 | 3.8 | 3.8 | 2.4 | 2.2 | 2.2 |
| Coefficient of thermal expansion (ppm/° C.) | ($*10^{-6}$/° C.) MD | 380 | 300 | 360 | 145 | 155 | 158 |
| Tensile stress at 150% elongation at 160° C. (kg/cm$^2$) | | 211 | 225 | 227 | 150 | 155 | 170 |
| Oxygen permeability cc/(m$^2$ · 24 hr · atm) | | 150 | 120 | 120 | 150 | 120 | 120 |
| Equilibrium moisture content (25° C., RH 65%) | | 3.5 | 3.2 | 3.3 | 6.2 | 6.0 | 6.0 |

As shown in Table 1, it was confirmed that shrinkage rates measured when the tire inner liner films of the examples were elongated 150% at 80 to 160° C. and cooled to room temperature were all 4% or less. Specifically, since the tire inner liner film has a low shrinkage rate even if elongated or deformed at a high temperature and then cooled, excellent formability and high shape stability may be secured even in a tire manufacturing process during which high elongation and deformation occur at a high temperature.

It was also confirmed that the tire inner liner films of the examples have coefficients of thermal expansion of 145× $10^{-6}$/° C. to 380×$10^{-6}$/° C. at 80° C. to 160° C. Specifically, the tire inner liner films of the examples may exhibit low coefficients of thermal expansion thus exhibiting excellent shape stability, and minimized deformation or shrinkage due to heat thus preventing cracks or peel-off from a carcass layer due to repeated deformations or elongation-shrinkage in a high temperature tire manufacturing process or in an automobile running process.

It was also confirmed that the tire inner liner films of the examples generate tensile stress of 230 kg/cm$^2$ or less even when elongated 150% at 160° C. Specifically, since a small load is generated even if the tire inner liner films of the examples are elongated under specific conditions in a tire manufacturing process, shape stability of a green tire or a final tire may be improved.

It was also confirmed that the tire inner liner films of the examples may exhibit low oxygen permeability of 200 cc/(m$^2$·24 hr·atm) or less while having a thick thickness, thus achieving a high gas barrier property.

Further, the tire inner liner films of Examples 4 to 6 passing aging under constant temperature and humidity conditions exhibited an equilibrium moisture content of 6.0% to 6.2% under a temperature of 25° C. and relative humidity of 65%.

TABLE 2

Results of Experimental Examples 1 to 4 for Comparative Examples 1 to 4

| | | Comparative Example 1 | Comparative Example 2 | Comparative Example 3 | Comparative Example 4 |
|---|---|---|---|---|---|
| Shrinkage rate (%) | 80° C./150% elongation | 10.2 | 5.7 | 7.7 | 5.7 |
| | 100° C./150% elongation | 16.3 | 5.9 | 7.2 | 5.4 |
| | 120° C./150% elongation | 16.2 | 5.4 | 7.4 | 5.9 |
| | 160° C./150% elongation | 16.1 | 4.4 | 7.5 | 5.4 |
| Coefficient of thermal expansion (ppm/° C.) | (*$10^{-6}$/° C.) MD | 580 | 167 | 450 | 150 |
| Tensile stress at 150% elongation at 160° C. (kg/cm$^2$) | | 181 | 450 | 200 | 526 |
| Oxygen permeability cc/(m$^2$ · 24 hr · atm) | | 300 | 226 | 387 | 180 |
| Equilibrium moisture content (25° C., RH 65%) | | 6.0 | 5.8 | 6.0 | 5.8 |

As shown in Table 2, it was confirmed that the inner liner film of Comparative Example 1 obtained using butyl rubber exhibits a shrinkage rate of about 10% to 16.3% as measured when elongated 150% at 80 to 160° C. and cooled to room temperature, and thus the length and the shape of the film are significantly changed when elongated at a high temperature.

Further, it was confirmed that although the inner liner films of Comparative Examples 2 and 4 exhibit a low shrinkage rate of about 4 to 5% compared to Comparative Example 1, as measured when elongated 150% at 80 to 160° C. and cooled to room temperature, the shrinkage rate is high compared to the inner liner films of the examples, and thus the deformation rate of the length or the shape is relatively high when elongated at a high temperature and then cooled. It was also confirmed that the inner liner films of Comparative Examples 2 and 4 respectively exhibit stress of 450 kg/cm$^2$ and 526 kg/cm$^2$ when elongated 150% at 160° C., and thus they may not be easily formed in a tire manufacturing process.

In addition, it was confirmed that the inner liner film of Comparative Example 3 exhibits a shrinkage rate of about 7.2% to 7.7%, as measured when elongated 150% at 80 to 160° C. and cooled to room temperature, and thus the length and the shape of the film are significantly changed when elongated at a high temperature, and that it exhibits oxygen permeability of 387 cc/(m$^2$·24 hr·atm) and thus the gas barrier property is low.

It was also confirmed that the inner liner films of Comparative Examples 1 and 3 exhibit coefficients of thermal expansion of greater than 400*$10^{-6}$/° C., and thus the shape or the length is significantly changed at a high temperature.

Experimental Example 6: Measurement of Formability

Tires were manufactured using the tire inner liner films of the examples and comparative examples, applying the 205R/65R16 standard. During the tire manufacturing process, manufacturability and appearance were evaluated after manufacturing a green tire, and then the final appearance of the tire was examined after vulcanization.

Herein, it was judged as "good" when there is no crushing of a green tire or a tire after vulcanization, and a standard deviation of diameter is within 5%. Also, it was judged as "shape faulty" when crushing of a green tire or a tire after vulcanization is generated and thus a tire is not properly manufactured, the inner liner in the tire is dissolved or torn and damaged, or a standard deviation of diameter is greater than 5%.

Experimental Example 7: Measurement of Internal Pressure Retention

Using tires manufactured in Experimental Example 3, 90 day IPR (internal pressure retention) was measured and compared/evaluated under a 21° C. temperature and a 101.3 kPa pressure according to ASTM F 1112-06.

The measurement results of Experimental Examples 6 to 7 are summarized in the following Table 3.

TABLE 3

Results of Experimental Examples 6 and 7

| | Manufactured state of green tire | State of final tire | Internal pressure retention (%) |
|---|---|---|---|
| Example1 | Good | Good | 96.2 |
| Example2 | Good | Good | 97.1 |
| Example3 | Good | Good | 96.3 |
| Example4 | Good | Good | 96.4 |
| Example5 | Good | Good | 96.7 |
| Example6 | Good | Good | 97.1 |
| Comparative Example1 | Good | Good | 91.4 |
| Comparative Example2 | Good | Good | Not Applicable |
| Comparative Example3 | Good | Good | Not Applicable |
| Comparative Example4 | Good | Good | Not Applicable |

As shown in Table 3, if the tire inner liner films of the examples are applied, sufficient stretching may be achieved even if the expansion pressure is applied in a tire manufacturing process, and thus the manufactured state of the final tire is good.

Meanwhile, as shown in the results of Experimental Example 7, the tires manufactured using the tire inner liner films of the examples exhibit internal pressure retention of 95% or more, when 90 day IPR (internal pressure retention) of the tires using the tire inner liner films is measured at 21° C. and 101.3 kPa according to ASTM F1112-06, thus preventing overturning accidents and mileage lowering due to low internal pressure.

To the contrary, the tires manufactured using the tire inner liner films of the comparative examples exhibit relatively low internal pressure retention, or internal pressure retention could not be measured due to inferior performance of retaining internal pressure for a long time.

DESCRIPTION OF REFERENCE NUMERALS AND SIGNS

1. Tread
2. Shoulder
3. Side Wall
4. Cap ply
5. Belt
6. Body Ply
7. Inner Liner
8. Apex
9. Bead

What is claimed is:

1. A film for a tire inner liner, comprising:
a base film layer comprising a polyamide-based resin and an elastomer copolymer comprising polyamide-based segments and polyether-based segments; and
an adhesive layer comprising a resorcinol-formalin-latex (RFL)-based adhesive,
wherein the content of the polyether-based segments in the elastomer copolymer is 15 to 50 wt % based on total weight of the base film layer, and the base film layer comprises the polyamide-based resin and the elastomer copolymer in a weight ratio of 5:5 to 4:6,
the thickness of the base film layer is 30 to 300 μm, and the film for a tire inner liner has a shrinkage rate of 5% or less when elongated 50 to 150% at 80 to 160° C. and then cooled to room temperature,
wherein the elastomer copolymer has a weight average molecular weight of 50,000 to 300,000.

2. The film for a tire inner liner according to claim 1, wherein the film for a tire inner liner has a shrinkage rate of 3% or less when elongated 150% at 160° C. and then cooled to room temperature.

3. The film for a tire inner liner according to claim 1, wherein the film for a tire inner liner has a coefficient of thermal expansion of $100\times10^{-6}$/° C. to $500\times10^{-6}$/° C. at 80 to 160° C.

4. The film for a tire inner liner according to claim 1, wherein the film for a tire inner liner has tensile stress of 310 kg/cm$^2$ or less when elongated 150% at 160° C.

5. The film for a tire inner liner according to claim 1, wherein the polyamide-based resin has relative viscosity (sulfuric acid 96% solution) of 3.0 to 3.5.

6. The film for a tire inner liner according to claim 1, wherein the elastomer copolymer comprises polyamide-based segments and polyether-based segments in a weight ratio of 6:4 to 3:7.

7. The film for a tire inner liner according to claim 1, wherein the base film layer is an unstretched film.

8. The film for a tire inner liner according to claim 1, wherein the adhesive layer is formed on at least one side of the base film layer to a thickness of 0.1 to 20 μm.

9. The film for a tire inner liner according to claim 1, wherein the resorcinol-formalin-latex (RFL)-based adhesive comprises 2 to 30 wt % of a condensate of resorcinol and formaldehyde, and 70 to 98 wt % of latex.

10. The film for a tire inner liner according to claim 1, wherein the base film layer has an equilibrium moisture content (25° C., 65% RH) of 5 to 9%.

11. A method for manufacturing a film for a tire inner liner, comprising:
mixing at a weight ratio of 5:5 to 4:6 a polyamide-based resin and an elastomer copolymer comprising polyamide-based segments and polyether-based segments;
melting and extruding the mixture of the polyamide-based resin and the elastomer copolymer comprising polyamide-based segments and polyether-based segments at 230 to 300° C. to form a base film layer having a thickness of 30 to 300 μm; and
forming an adhesive layer comprising a resorcinol-formalin-latex (RFL)-based adhesive on at least one side of the base film layer,
wherein the content of the polyether-based segments in the elastomer copolymer is 15 to 50 wt % based on total weight of the base film layer, and
the film for a tire inner liner has a shrinkage rate of 5% or less when elongated 50 to 150% at 80 to 160° C. and then cooled to room temperature,
wherein the elastomer copolymer has a weight average molecular weight of 50,000 to 300,000.

12. The method according to claim 11, wherein the manufactured tire inner liner has a coefficient of thermal expansion of $1\times10^{-6}$/° C. to $5000\times10^{-6}$/° C. at 80 to 160° C.

13. The method according to claim 11, wherein the elastomer copolymer comprises polyamide-based segments and polyether-based segments in a weight ratio of 6:4 to 3:7.

14. The method according to claim 11, further comprising a step of solidifying the base film layer formed by melting and extrusion in a cooling part maintained at 5 to 40° C.

15. The method according to claim 11, wherein the step of forming an adhesive layer comprises coating an adhesive comprising 2 to 30 wt % of a condensate of resorcinol and formaldehyde, and 68 to 98 wt % of latex, on at least one side of the base film layer to a thickness of 0.1 to 20 μm.

16. The method according to claim 11, further comprising a step of aging the base film layer under constant temperature and humidity conditions.

17. The method according to claim 16, wherein the step of aging the base film layer under constant temperature and humidity conditions is conducted at a temperature selected from 20° C. to 30° C. and relative humidity selected from 60% to 70% for 12 hours to 48 hours.

* * * * *